April 2, 1929.  I. A. CASWELL  1,707,845
WEED AND GRASS BURNING DEVICE
Filed Nov. 19, 1927  2 Sheets-Sheet 1

Irving A. Caswell
INVENTOR
BY Victor J. Evans
ATTORNEY

WITNESS:

April 2, 1929.　　　I. A. CASWELL　　　1,707,845
WEED AND GRASS BURNING DEVICE
Filed Nov. 19, 1927　　　2 Sheets-Sheet 2

Irving A. Caswell
INVENTOR
BY Victor J. Evans
ATTORNEY

WITNESS:

Patented Apr. 2, 1929.

1,707,845

UNITED STATES PATENT OFFICE.

IRVING A. CASWELL, OF MINNEAPOLIS, MINNESOTA.

WEED AND GRASS BURNING DEVICE.

Application filed November 19, 1927. Serial No. 234,475.

This invention relates to machines for burning vegetation, and has for an object the provision of a machine by means of which grass and other vegetation may be destroyed, or the top of the grass or vegetation may be burned off to an even height.

For this purpose, the invention provides a machine by means of which a hot confined flame may be directed upon the vegetation to burn the same, means being provided for subsequently directing a spray of water onto the burning vegetation to extinguish the flame, so that a short, practically even growth will remain.

With the above and other objects in view, the invention further includes the following novel features and details of construction, to be hereinafter more fully described, illustrated in the accompanying drawings and pointed out in the appended claims.

In the drawings:—

Figure 1:
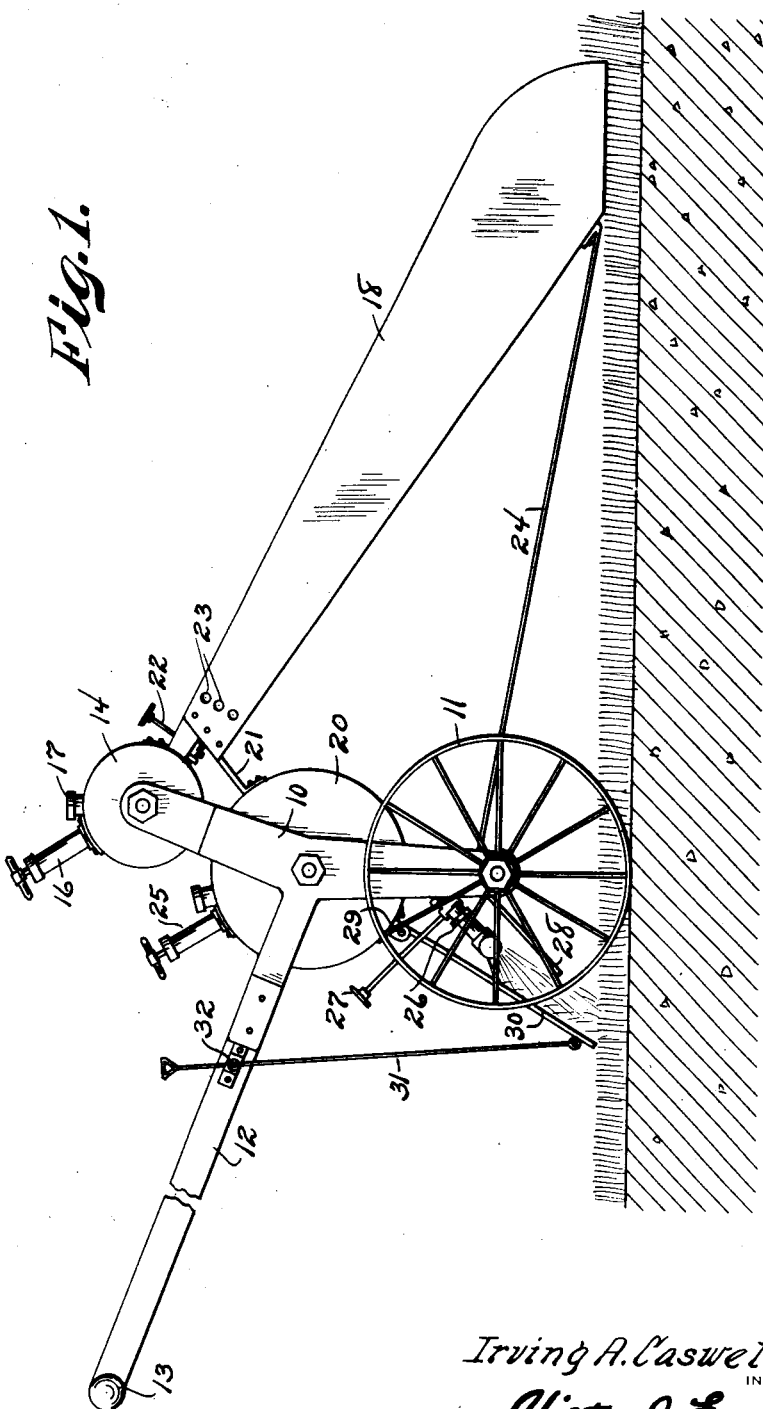
Figure 1 is a side view of the invention.
Figure 2:
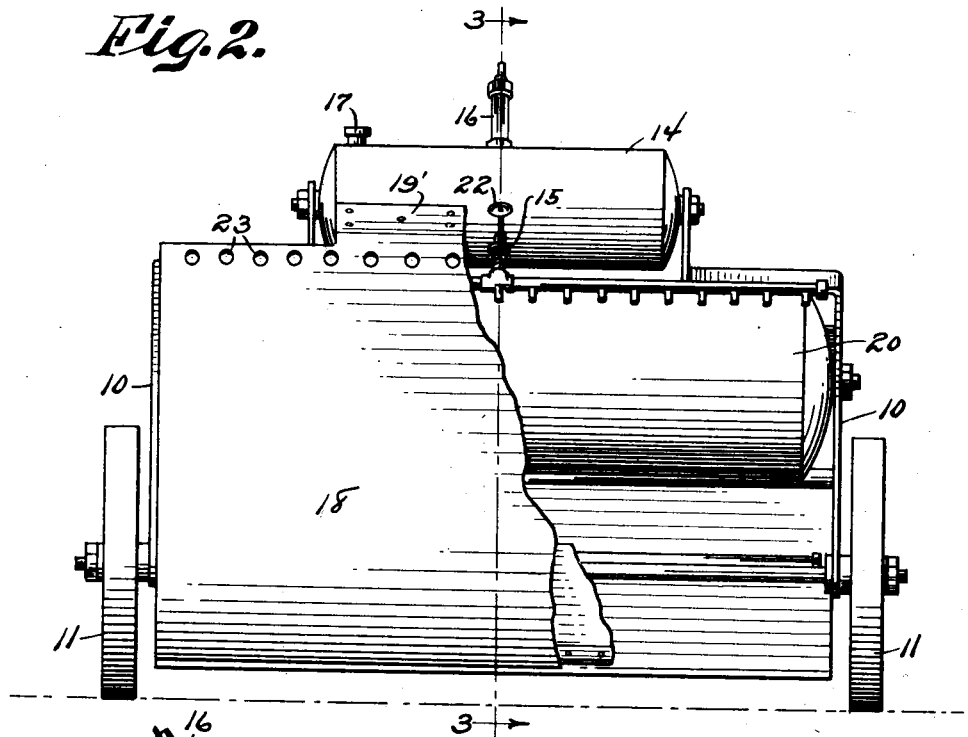
Figure 2 is a front view with parts broken away.

Referring to the drawings in detail wherein like characters of reference denote corresponding parts, the reference character 10 indicates a frame which is supported upon wheels 11 and from which extends a handle 12 having hand grips 13, by means of which the machine may be conveniently manipulated.

Mounted in the top of the frame is a fuel supply tank 14 which is adapted to contain a supply of gasoline or like liquid. This tank is designed to supply fuel under pressure to a burner 15 and any suitable means may be utilized for supplying the pressure. However, a pump 16 is shown for this purpose. A normally closed filling opening 17 is provided for the tank.

The burner extends forwardly and downwardly into the upper inner end of a flame conduit 18. This conduit is outwardly flared and has its lower open end 19 arranged to be moved parallel with the surface of the ground. The inner end of the conduit is secured to the tank 14 as shown at 19', and to a tank 20 as shown at 21, so as to support this end of the conduit. The burner 15 is controlled by a valve 22 and air is admitted to the inner end of the conduit through openings 23 so as to promote combustion. By means of the apparatus described, a hot flame may be directed outwardly to the open end of the conduit. The lower open end of the conduit has secured thereto a supporting plate 24 and this plate extends rearwardly and is secured to the frame 10 and acts to support the outer end of the conduit so that the latter is rigidly supported.

Figure 3:
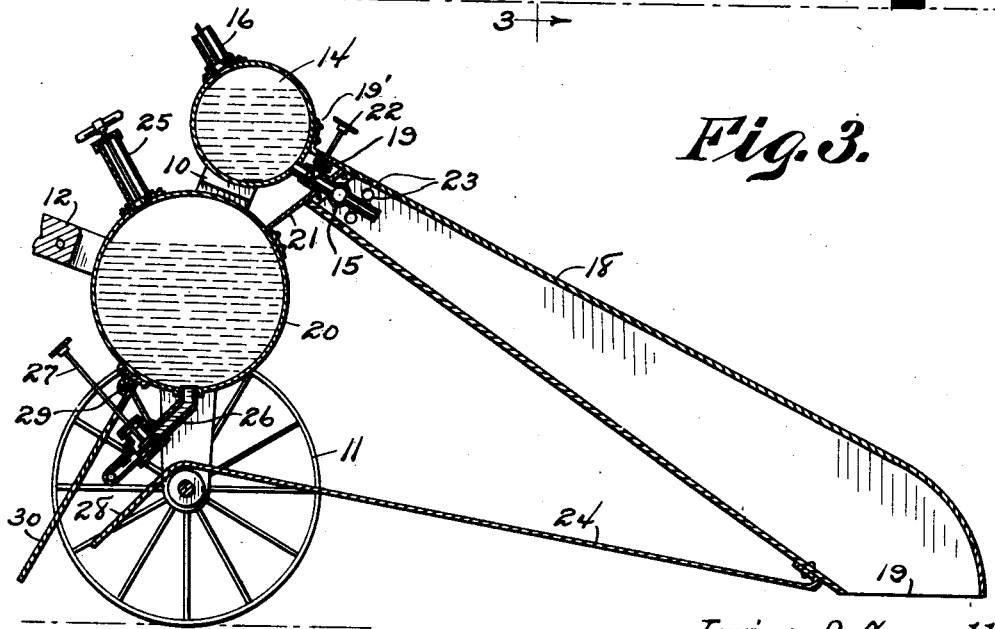
Figure 3 is a sectional view on the line 3—3 of Figure 2.

The tank 20 just referred to is also mounted in the frame 10 and this tank is adapted to contain a supply of water. Like the tank 14, the tank 20 is equipped with a pressure pump 25. A discharge pipe 26 extends from the tank 20, and as shown in Figures 1 and 3 of the drawings, this pipe extends downwardly and rearwardly and is controlled by a valve 27. An apron 28 extends outwardly and rearwardly in advance of the pipe 26 and this apron is preferably formed by a continuation of the plate 24.

Hingedly secured to the tank 20 as shown at 29 is a deflecting apron 30. This apron extends downwardly at the rear of the pipe 26, so that the water spray from the pipe is confined between the apron 28 and 30. The apron 30 is adjustable so as to direct the spray more directly downward when desired, and for this purpose a rod 31 has one end secured to the apron 30, while its opposite end is adjustably secured to the handle 12 as shown at 32.

Through the use of the invention, vegetation may be burned in such manner as to be entirely destroyed, or, the top of the vegetation may be burned off to an even height, water from the tank 20 extinguishing the fire within a very short time after the vegetation has been ignited by the flame from the conduit 18.

The invention is susceptible of various changes in its form, proportions and minor details of construction and the right is herein reserved to make such changes as properly fall within the scope of the appended claims.

Having described the invention what is claimed is:—

1. A machine of the character described comprising a wheel supported frame, a forwardly and downwardly extending flame conduit, means to supply a flame to the conduit, means mounted upon the frame to direct a supply of water rearwardly of the flame conduit, an adjustable deflector plate positioned rearwardly of the water supply directing means and means to adjust the plate with respect to the water supply means.

2. A machine of the character described comprising a wheel supported frame, a forwardly and downwardly extending flame conduit, means to supply a flame to the conduit, means mounted upon the frame to direct a supply of water rearwardly of the flame conduit, a stationary apron located in advance of the water supply means, and adjustable means at the rear of the water supply to deflect the water supply downward.

3. A machine of the character described comprising a wheel supported frame, a pressure controlled fuel supply tank mounted upon the frame, a burner extending from the tank, a flame conduit extending forwardly and outwardly from the burner, a pressure controlled water tank also mounted upon the frame, means connecting the inner end of the flame conduit with the water tank to support the inner end of said conduit, a supporting plate having its forward edge connected with the outer end of the flame conduit and its rear edge connected to the frame, and fire extinguishing means located rearwardly of the flame conduit.

In testimony whereof I affix my signature.

IRVING A. CASWELL.